United States Patent
Liu

(10) Patent No.: US 9,818,011 B2
(45) Date of Patent: *Nov. 14, 2017

(54) METHOD AND DEVICE FOR IDENTIFYING TWO-DIMENSIONAL BARCODES

(71) Applicant: Tencent Technology (Shenzhen) Company Limited, Shenzhen, Guangdong (CN)

(72) Inventor: Jing Liu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/629,204

(22) Filed: Jun. 21, 2017

(65) Prior Publication Data

US 2017/0286736 A1   Oct. 5, 2017

Related U.S. Application Data

(63) Continuation of application No. 14/801,524, filed on Jul. 16, 2015, now Pat. No. 9,710,687, which is a
(Continued)

(30) Foreign Application Priority Data

Jul. 2, 2013   (CN) .......................... 2013 1 02744558

(51) Int. Cl.
  *G06F 17/00*   (2006.01)
  *G06K 7/14*   (2006.01)
  (Continued)

(52) U.S. Cl.
  CPC ..... *G06K 7/1417* (2013.01); *G06F 17/30861* (2013.01); *G06F 17/30879* (2013.01);
  (Continued)

(58) Field of Classification Search
  CPC .. G06K 9/2054; G06K 9/46; G06F 17/30861; G06F 17/30879; G06F 21/36
  See application file for complete search history.

(56) References Cited

U.S. PATENT DOCUMENTS

| 8,943,320 B2 * | 1/2015 | Sabin ...................... G06F 21/35 |
| | | 713/171 |
| 9,710,687 B2 * | 7/2017 | Liu .................... G06F 17/30879 |
| 2013/0111208 A1 | 5/2013 | Sabin et al. |

FOREIGN PATENT DOCUMENTS

| CN | 101510269 A | 8/2009 |
| CN | 101964044 A | 2/2011 |
| | (Continued) | |

OTHER PUBLICATIONS

International Preliminary Report on Patentability and Written Opinion received in PCT Application No. PCT/CN2014/081339 dated Jan. 5, 2016.
(Continued)

*Primary Examiner* — Christle I Marshall
(74) *Attorney, Agent, or Firm* — Brinks Gilson & Lione

(57) ABSTRACT

A method and device for identifying 2-dimensional (2-D) barcodes contained within a retrieved webpage are disclosed. The method includes the operations of: launching a browser to retrieve at least one webpage; receiving an instruction input by a user for identifying at least one 2-D barcode contained within the at least one retrieved webpage; determining according to the input instruction, whether the at least one 2-D barcode may be available within the at least one retrieved webpage; if the at least one 2-D barcode may be available within the at least one retrieved webpage, obtaining at least one 2-D barcode image; and identifying the least one 2-D barcode image, and obtaining 2-D barcode information associated with the identified least one 2-D barcode image. The disclosed method and device simplifies
(Continued)

operations of 2-D barcodes identification within the retrieved webpage.

14 Claims, 3 Drawing Sheets

Related U.S. Application Data continuation of application No. PCT/CN2014/081339, filed on Jul. 1, 2014.

(51) Int. Cl.
    *G06F 17/30*    (2006.01)
    *H04L 29/08*    (2006.01)
    *G06K 9/46*    (2006.01)
    *G06K 9/20*    (2006.01)
    *G06F 21/36*    (2013.01)

(52) U.S. Cl.
    CPC ........... *G06F 21/36* (2013.01); *G06K 7/1447* (2013.01); *G06K 9/2054* (2013.01); *G06K 9/46* (2013.01); *H04L 67/02* (2013.01)

(56) References Cited

FOREIGN PATENT DOCUMENTS

| | | |
|---|---|---|
| CN | 102103627 A | 6/2011 |
| CN | 102833353 A | 12/2012 |

OTHER PUBLICATIONS

International Search Report received in PCT Application No. PCT/CN2014/081339 dated Oct. 13, 2014.
Office Action dated Sep. 8, 2017 for Chinese Application No. 201310274455.8, 7 pages.

* cited by examiner

METHOD AND DEVICE FOR IDENTIFYING TWO-DIMENSIONAL BARCODES

CROSS-REFERENCE TO RELATED APPLICATIONS

The application is a continuation of U.S. application Ser. No. 14/801,524, filed on Jul. 16, 2015, which is a continuation of PCT Application No. PCT/CN2014/081339, filed on Jul. 1, 2014, which claims priority to Chinese Patent Application No. 2013102744558, filed on Jul. 2, 2013. Both of which are incorporated by reference in their entireties.

FIELD OF THE TECHNOLOGY

The present invention relates to a method and device for identifying 2-dimensional barcodes contained within a retrieved webpage in the field of image identification technology.

BACKGROUND

Emerging two-dimensional (2-D) barcodes technology may store or encode brand names, product identification, price, quantity, schedule, address, owner's and client's name information, which find wide industrial and commercial applications in commodities taging, inventory tracking, even in transportation, finance, and drug industries, to name a few. 2-D barcodes gain wide attention to businesses because they offer a cost-effective solution in providing large storage capacity with high confidentiality.

Similar in concept to traditional one-dimensional (1-D) barcode technology which utilizes a pattern of black lines and white lines (appear as bars and spacing) linearly arranged across in a single dimension, while 2-D barcode technology utilizes two dimensional geometric patterns to form an image to store data information. Information stored in 2-D geometric image patterns are encoded according to certain standard rules on a planar graph checkered with black lines and white lines.

Current method may utilize information stored in a 2-D bar codes image to gain access to Internet. More specifically, a user may first take a picture of the 2-D barcodes image using a built in camera on the mobile terminal, then send the 2-D barcodes image to another website which identifies the 2-D barcodes image to read the associated information or the website information corresponding to the taken 2-D barcodes image. Afterwards, the user may utilize the identified website information to launch the browser to visit the webpage.

However, if a user happens to be visiting a webpage which contains a native 2-D barcodes image, the user may not be able to readily access the stored information contained in the native 2-D barcodes image within the webpage. Instead, the user may be required to utilize a built-in camera of a second mobile terminal to take a picture of the 2-D barcodes image contained within the visited website, then separately sends the 2-D barcodes image taken on the second mobile terminal to another website to identify the 2-D barcodes image and to access the stored information associated with the taken 2-D barcodes image. In this regard, the additional hardware requirement and the additional operations to access the stored information of the native 2-D barcodes image within the visiting website create inconvenience to user's experience.

SUMMARY

The embodiments of the present disclosure are intended to provide a method and device for identifying 2-D barcodes contained within a retrieved webpage (also known as native visited webpage). More specifically, the embodiments offer solutions to solve the above problems of a mobile terminal's inability to identify a native 2-D barcode displayed on its own display interface when visiting a webpage.

An embodiment of the present disclosure provides a method for identifying 2-Dimensional (2-D) barcodes contained within a retrieved webpage. The method include at least the following exemplary operations: launching a browser to retrieve at least one webpage; receiving an instruction input by a user for identifying at least one 2-D barcode contained within the at least one retrieved webpage; determining according to the input instruction, whether the at least one 2-D barcode may be available within the at least one retrieved webpage; if the at least one 2-D barcode may be available within the at least one retrieved webpage, obtaining at least one 2-D barcode image; and identifying the least one 2-D barcode image, and obtaining 2-D barcode information associated with the identified least one 2-D barcode image.

Another embodiment of the disclosure provides a device for identifying 2-Dimensional (2-D) barcodes contained within a retrieved webpage. The device includes at least a processor with circuitry operating in conjunction with at least a memory which stores instruction codes operable as plurality of units, wherein the plurality of units include: a browser which launches to a website to retrieve at least one webpage; an instruction receiving unit, which receives an instruction input by a user for identifying at least one 2-D barcode contained within the at least one retrieved webpage; a retrieving unit, which retrieves the at least one webpage according to the instruction and determines whether the at least one 2-D barcode may be available within the at least one retrieved webpage; a 2-Dimensional barcode image acquisition unit, which obtains at least one 2-D barcode image, if the at least one 2-D barcode may be available within the at least one retrieved webpage; and an identifying unit, which identifies the least one 2-D barcode image, and obtains 2-D barcode information associated with the identified least one 2-D barcode image.

Another embodiment of the disclosure discloses a non-transitory computer-readable storage medium, wherein the computer readable storage medium stores a program which comprises codes or instructions to cause a processor circuitry to execute operations for identifying 2-Dimensional (2-D) barcodes contained within a retrieved webpage, the operations including: launching a browser to retrieve at least one webpage; receiving an instruction input by a user for identifying at least one 2-D barcode contained within the at least one retrieved webpage; determining according to the input instruction, whether the at least one 2-D barcode may be available within the at least one retrieved webpage; if the at least one 2-D barcode may be available within the at least one retrieved webpage, obtaining at least one 2-D barcode image; and identifying the least one 2-D barcode image, and obtaining 2-D barcode information associated with the identified least one 2-D barcode image.

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, the newly added features, or features that are different from those previously described in each new embodiment will be described in details. Similar features may be referenced back to the prior descriptions in a prior numbered drawing or referenced ahead to a higher numbered drawing.

In order to clarify the object, technical scheme and advantages of the present disclosure more specifically, the present disclosure may be illustrated in further details with the accompanied drawings and embodiments. It should be understood that the embodiments described herein are merely examples to illustrate the present disclosure, but not to limit the present disclosure.

The disclosed embodiments of the method and device may be applicable to mobile terminals, such as a smart phone, a PC, a lap top computer, a tablet network device or any device having functionalities of inputting or executing instructions from one or more applications, connecting to a network and displaying webpage contents.

Figure 1:
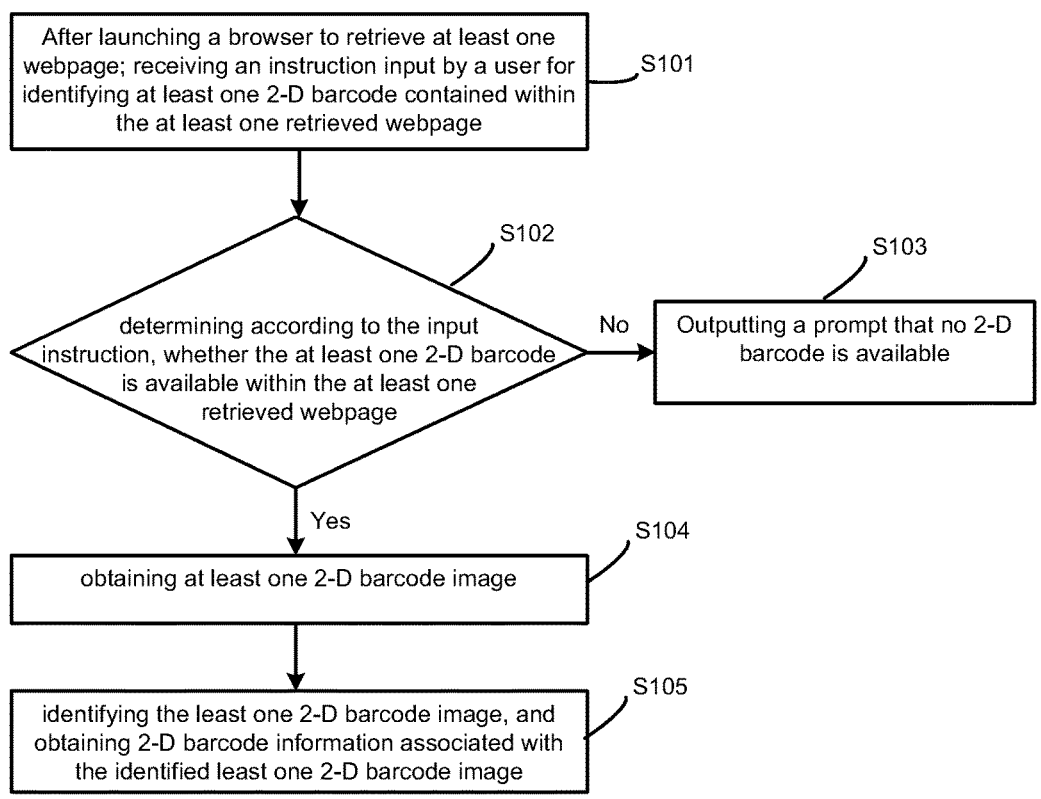
FIG. 1 may be a flowchart illustrating an exemplary method for identifying 2-Dimensional (2-D) barcodes contained within a retrieved webpage, according to an embodiment of the present disclosure.

FIG. 1 may be a flowchart illustrating an exemplary method for identifying 2-Dimensional (2-D) barcodes contained within a retrieved webpage, according to an embodiment of the present disclosure. The method may include the following exemplary operations:

S101: After launching a browser to retrieve at least one webpage, receiving an instruction input by a user for identifying at least one 2-D barcode contained within the at least one retrieved webpage. The user may browse a webpage utilizing an application program of the mobile terminal (for example, using a browser). After the user sees a 2-D barcode displayed on the webpage, the user may input an instruction so as to trigger an operation to identify the 2-D barcode.

S102: determining according to the input instruction, whether the at least one 2-D barcode may be available within the at least one retrieved webpage. If no 2-D barcode may be available in the webpage, proceeding to Step S103; if a 2-D barcode may be available in the webpage, proceeding to Step S104.

In an embodiment, each 2-D barcode may be displayed as a square pattern in the webpage. Therefore, the determining may include performing an image identification to determine whether the webpage may contain a 2-D barcode. In other words, 2-D barcode image features may be utilized to identify a 2-D barcode in the webpage. The 2-D barcode image features may include one or more shapes, colors, sizes, or special marks, wherein the special marks may be marks particular to 2-D barcodes, such as QR codes (a common type of 2-D barcodes). In addition, three of the four corners of a 2-D barcode may each take on a hollow-square shape, which may be used as a special mark. Image identification technology may be used to identify whether a webpage contains a graph or image conforming to the 2-D barcode graph features or image features. If yes, then the image identification may indicate that the webpage contains a 2-D barcode; if not, it may indicate that the webpage does not contain 2-D barcode.

In addition to the image identification technology, source codes may also be used to determine whether a webpage may contain a 2-D barcode. Specifically, if a webpage contains a 2-D barcode, the source codes of the webpage contain a code tag in a specific format, so that the webpage may display the associated 2-D barcode graph or image. Therefore, whether the webpage may contain a 2-D barcode or not may be determined by retrieving the source codes of the webpage and by determining whether a code tag associated with any 2-D barcode may be available.

S103: In case if no 2-D barcode may be determined, outputting a prompt that no 2-D barcode may be available.

S104: Obtaining at least one 2-D barcode image in the webpage. A 2-D barcode image may contain a location-use pattern in order to scan the 2-D barcode. A screenshot of the 2-D barcode area in a webpage may be obtained by using the location-use pattern of a 2-D barcode, in order to obtain the 2-D barcode image. The obtained 2-D barcode image may also be locally saved on the mobile terminal.

S105: identifying the least one 2-D barcode image, and obtaining 2-D barcode information associated with the identified least one 2-D barcode image. In an embodiment, the 2-D barcode information may be one or more of the followings: numbers, text, symbols and images. A 2-D barcode image may be identified in two modes: direct identification and indirect identification.

Figure 3A:
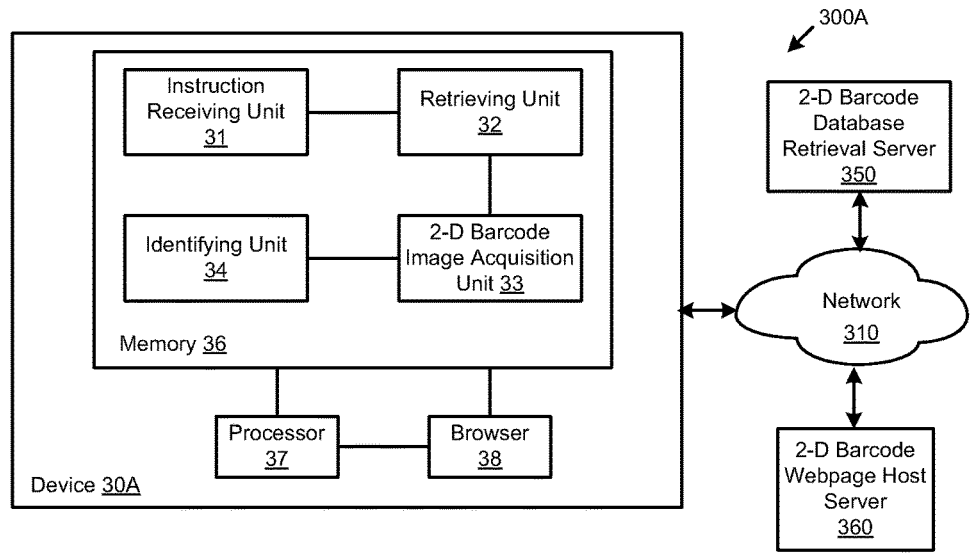
FIG. 3A illustrates a system with an exemplary structure diagram of a device for identifying 2-Dimensional (2-D) barcodes contained within a retrieved webpage, according to an embodiment of the present disclosure.
Figure 3B:
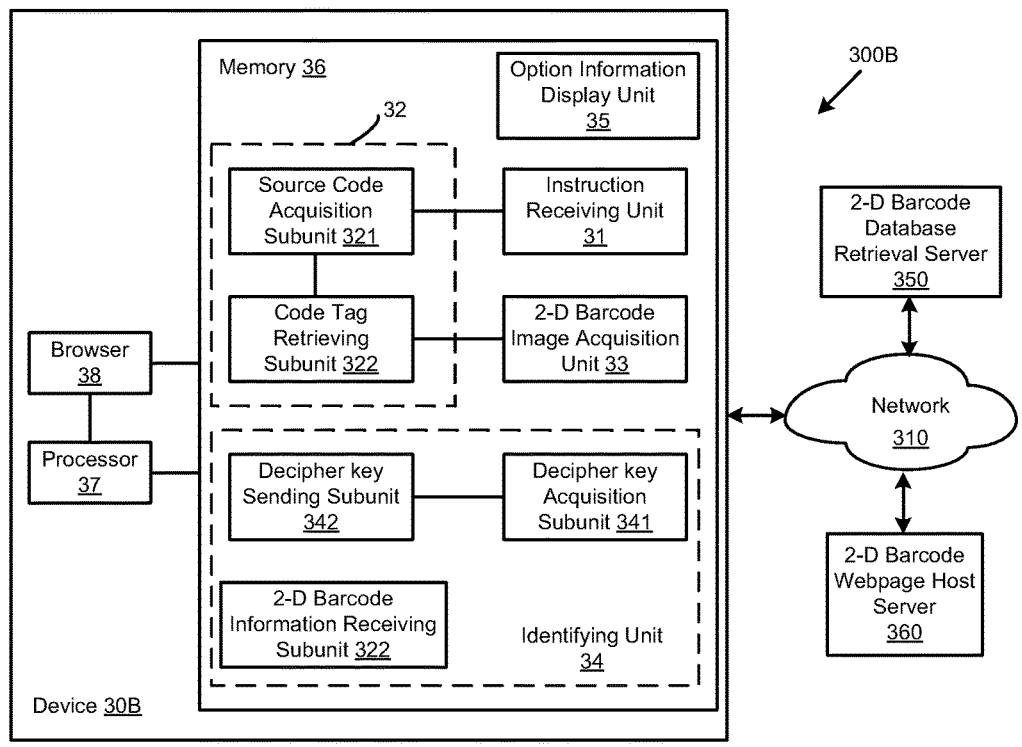
FIG. 3B illustrates a system with an exemplary structure diagram of a device for identifying 2-Dimensional (2-D) barcodes contained within a retrieved webpage, according to another embodiment of the present disclosure.

Direct identification may be to start local applications within the mobile terminal according to the information available from an obtained 2-D barcode decipher key without the assistance of a remote network server (i.e., a 2-D barcode database/server (350) in FIGS. 3A, 3B) in order to complete related services, such as saving a phone number, initiating a call, sending a short message, saving an Email address, sending an Email, or building an automatic link to a URL. Direct identification may be suitable for a 2-D barcode with a certain storage capacity, for example, for decoding QR codes.

Indirect identification means that a mobile terminal (30A or 30B in FIGS. 3A, 3B) may need to submit information available from a 2-D barcode decipher key to a remote network server (i.e., a 2-D barcode database/server (350) in FIGS. 3A, 3B), then afterwards the remote network server may control the related applications. Take the electronic business card application as an example: the information identified by a mobile terminal may not necessarily be the content of an electronic business card, but rather the information about a link address of a network server and the database index (i.e., a 2-D barcode database/server (350) in FIGS. 3A, 3B). Such information may be submitted by the mobile terminal to the remote network server first, and then may be resolved by the remote network server (350) through the WAP (Wireless Application Protocol), thereby obtaining the business card information (for example, corporate advertisements) stored on the network side.

In other words, the mobile terminal may identify the information about the link address of the network server and the enterprise website index, and subsequently the network server (350) may resolve such information through the WAP and links itself to the enterprise website. Indirect identification may be suitable for a 2-D barcode with a small storage capacity, for example, for decoding DM code or PDF417 code. If supported by the remote network server, indirect identification may also work as follows: sending a 2-D barcode image directly to a remote network server for identification, and then receiving the identified 2-D barcode information returned by the remote network server.

Figure 2:
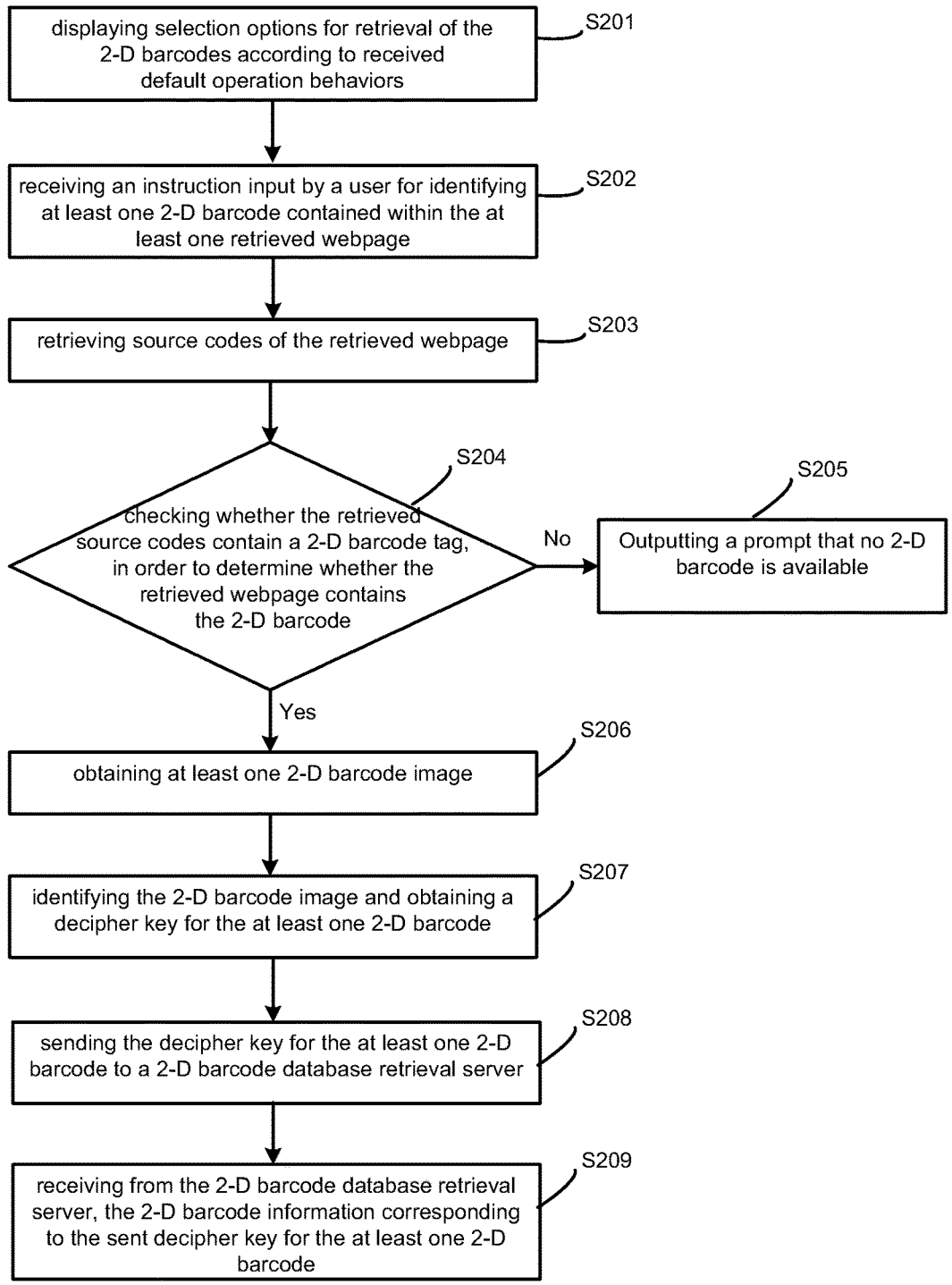
FIG. 2 may be a flowchart illustrating an exemplary method for identifying 2-Dimensional (2-D) barcodes contained within a retrieved webpage, according to another embodiment of the present disclosure.

FIG. 2 may be a flowchart illustrating an exemplary method for identifying 2-Dimensional (2-D) barcodes contained within a retrieved webpage, according to another embodiment of the present disclosure. The method may include the following exemplary operations:

S201: Displaying selection options for retrieval of the 2-D barcodes according to received default operation behaviors. The default operation behaviors may be set based on need. For example, setting an option to retrieve 2-D barcodes in menu options of an application program. Upon the user clicks on a corresponding menu option, the screen may display an option of 2-D barcodes retrieval. After the user presses and holds the screen for a predetermined period, the screen may display a prompt to allow the user to select whether or not to retrieve 2-D barcodes.

S202: Receiving an instruction input by a user for identifying at least one 2-D barcode contained within the at least one retrieved webpage, wherein the instruction may be an instruction according to the option information displayed at the previous step S201.

S203: Retrieving source codes of the retrieved webpage.

S204: Checking whether the retrieved source codes contain a 2-D barcode tag, in order to determine whether the retrieved webpage contains the 2-D barcode. If no 2-D barcode may be available in the webpage, proceeding to Step S205; if a 2-D barcode may be available in the webpage, proceeding to Step S206.

S205: Outputting a prompt that no 2-D barcode may be available.

S206: Obtaining at least one 2-D barcode image in the webpage, wherein the obtained 2-D barcode image may be locally saved on the local mobile terminal.

S207: Identifying the 2-D barcode image and obtaining a decipher key for the at least one 2-D barcode, wherein the 2-D barcode decipher key may be a code available by resolving a 2-D barcode image, which may be one or more of: letters, text, numbers, symbols and so on.

S208: Sending the decipher key for the at least one 2-D barcode to a 2-D barcode database retrieval server (350), wherein the 2-D barcode database retrieval server (350) (see FIG. 3B) may be a remote network server storing the 2-D barcode information (for example, images and texts) associated with a 2-D barcode decipher key. After a 2-D barcode decipher key may be sent to the 2-D barcode database server, the associated 2-D barcode information may be returned to the corresponding mobile terminal (30B).

S209: Receiving from the 2-D barcode database retrieval server, the 2-D barcode information corresponding to the sent decipher key for the at least one 2-D barcode.

FIG. 3A illustrates a system (300A) with an exemplary structure diagram of a device (30A) for identifying 2-Dimensional (2-D) barcodes contained within a retrieved webpage, according to an embodiment of the present disclosure. In an embodiment, the device (30A) may be a portion of or an entire mobile terminal for identifying a 2-D barcode displayed on a browser display.

As shown in FIG. 3, the device (30A) may include at least a processor (37) with circuitry operating in conjunction with a browser (36) and at least a memory (38) which stores instruction codes operable as plurality of units, wherein the plurality of units may include: an instruction receiving unit (31), a retrieving unit (32), a 2-D barcode image acquisition unit (33), and an identification unit (34). The retrieving unit (32) may be connected to the instruction receiving unit (31), the 2-D barcode image acquisition unit (33) may be connected to the retrieving unit (32), and the identifying unit (34) may be connected to the 2-D barcode image acquisition unit (33).

The browser (36) may launch to a website containing 2-D barcode which is hosted by a webpage host server (360).

The instruction receiving unit (31) may receive an instruction input by a user for identifying at least one 2-D barcode contained within the at least one retrieved webpage.

The retrieving unit (32) may retrieve the at least one webpage according to the instruction and determines whether the at least one 2-D barcode is available within the at least one retrieved webpage. The retrieving unit (32) may identify by the image identification technology whether the webpage contain an image conforming to 2-D barcode graph features, so as to determine whether a 2-D barcode may be available in the webpage. The retrieving unit (32) may also retrieve webpage source codes and check whether webpage source codes contain a 2-D barcode tag, so as to determine whether the webpage contain a 2-D barcode.

The 2-D barcode image acquisition unit (33) may obtain at least one 2-D barcode image, if the at least one 2-D barcode is available within the at least one retrieved webpage. A 2-D barcode image may contain positioning or coordinates readings for locating pattern features, so as to enable scanning of the 2-D barcode. The 2-D barcode image acquisition unit (33) may obtain a screenshot or cropping of the 2-D barcode area in a webpage by using the positioning or coordinates readings for locating pattern features of the 2-D barcode, and to generate the 2-D barcode image. The 2-D barcode image obtained by the 2-D barcode image acquisition unit (33) may also be locally stored in the device (30A) (i.e., the mobile terminal).

The identifying unit (34) may identify the least one 2-D barcode image, and obtain 2-D barcode information associated with the identified least one 2-D barcode image. The 2-D barcode information may be anyone of or a combination of: numbers, text symbols and images.

A 2-D barcode image may be identified by two ways: direct identification and indirect identification. When a decipher key may be directly displayed after analyzing the 2-D barcode image, the identifying unit (34) may directly obtain the 2-D barcode information (for example, a phone number, a website address, and so on) according to the 2-D barcode decipher key. When the decipher key may not be directly displayed after analyzing the 2-D barcode image, 2-D barcode information may need to be obtained with the assistance of a remote network server (such as the 2-D barcode database retrieval server (350)). The identifying unit (34) may adopt the way of indirect identification, that is, the identifying unit (34) may send a 2-D barcode image or 2-D barcode decipher key to the remote network server (such as the 2-D barcode database retrieval server (350)) first, and then the remote network server may obtain the 2-D barcode information associated with the 2-D barcode decipher key and return the information corresponding to the 2-D barcode image to the identifying unit (34).

FIG. 3B illustrates a system (300B) with an exemplary structure diagram of a device (30B) for identifying 2-Dimensional (2-D) barcodes contained within a retrieved webpage, according to another embodiment of the present disclosure. The device (30B) shown in FIG. 3B is similar to the device (30A) shown in FIG. 3A, except with an additional feature of an option information display unit (35), and detail information on both the retrieving unit (32) and identifying unit (34).

The option information display unit (35) may display selection options on the retrieval of the 2-D barcodes according to received default operations. The default operation behaviors may be set based on needs. For example, an option of retrieval of 2-D barcodes may be set in the menu selection options of an application program. Upon the user clicks on a corresponding menu option, the screen may display an option of 2-D barcodes retrieval. After the user presses and holds the screen for a predetermined period, the screen may display a prompt to allow the user to select whether or not to retrieve 2-D barcodes.

The retrieving unit (32) may further include a source code acquisition subunit (321) and a code tag retrieving subunit (322). The source code acquisition subunit (321) may be used to obtain webpage source codes after the instruction receiving unit (31) receives an instruction to identify a 2-D barcode. The code tag retrieving subunit (322) may be used to check whether the webpage source codes obtained by the source code acquisition subunit (321) contain a 2-D barcode tag, in order to determine whether the webpage may contain 2-D barcodes.

The identifying unit (34) may further include: a decipher key acquisition subunit (341), a decipher key sending subunit (342), and a 2-D barcode information receiving subunit (343). The decipher key acquisition subunit (341) may be used to identify a 2-D barcode image and obtain a 2-D barcode decipher key. The decipher key sending subunit (342) may be used to send the 2-D barcode decipher identified by the decipher acquisition subunit (341) to a 2-D barcode database retrieval server (350). The 2-D barcode information receiving subunit (343) may be used to receive the 2-D barcode information that may be sent by the 2-D barcode database retrieval server (350).

The disclosed method and device according to the disclosed embodiments therefore enable the device (i.e., mobile terminal) to identify 2-D barcodes native to the displayed webpage, thereby simplifying hardware requirement as well as the operations of users significantly.

It should be understood by those with ordinary skill in the art that all or some of steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive. ROM or flash memory.

The foregoing represents only some preferred embodiments of the present disclosure and their disclosure may not be construed to limit the present disclosure in any way. Those of ordinary skill in the art may recognize that equivalent embodiments may be created via slight alterations and modifications using the technical content disclosed above without departing from the scope of the technical solution of the present disclosure, and such summary alterations, equivalent has changed and modifications of the foregoing embodiments are to be viewed as being within the scope of the technical solution of the present disclosure.

What is claimed is:

1. A method for identifying 2-dimensional (2-D) barcodes contained within a retrieved webpage, comprising:
performing by a mobile terminal which comprises at least a processor executing program codes stored in a local memory of the mobile terminal, which configures the mobile terminal to perform steps, comprising:
launching a browser to retrieve at least one webpage;
receiving an instruction input by a user to identify if at least one native 2-D barcode is contained within the at least one retrieved webpage;
if it is determined by the mobile device that the at least one native 2-D barcode is contained within the at least one retrieved webpage and the native 2-D barcode information cannot be read by the mobile device:
without using an image capturing device on the mobile terminal to further perform a separate 2-D barcode image acquisition operation, obtaining directly by the mobile terminal, a corresponding decipher key pertaining to the at least one native 2-D barcode from the at least one native 2-D barcode itself; and
utilizing by the mobile terminal, the corresponding decipher key together with the at least one native 2-D barcode to start a local application within the mobile terminal to retrieve 2-D barcode information associated with the at least one native 2-D barcode according to the corresponding decipher key.

2. The method according to claim 1, wherein prior to the receiving of the instruction for identifying the at least one 2-D barcode, comprising:
displaying selection options for retrieval of the 2-D barcodes according to received default operation behaviors.

3. The method according to claim 1, wherein the determining of the at least one native 2-D barcode contained within the at least one retrieved webpage, comprising:
utilizing image identification technology to determine whether the at least one retrieved webpage contains image features conformable to 2-D barcode image features.

4. The method according to claim 1, wherein the determining of the at least one native 2-D barcode contained within the at least one retrieved webpage, comprising:
retrieving source codes of the retrieved webpage;
checking whether the retrieved source codes contain a 2-D barcode tag, in order to determine whether the retrieved webpage contains the at least one native 2-D barcode.

5. The method according to claim 1, wherein the identifying of the at least one native 2-D barcode and the receiving of the 2-D barcode information associated with the at least one native 2-D barcode, comprising:
deciphering by the local application within the mobile terminal, the identified at least one native 2-D barcode.

6. A device for identifying 2-dimensional (2-D) barcodes contained within a retrieved webpage, the device comprises at least a processor with circuitry executing instruction codes stored in a local memory, which configures a browser of the device to launch to a website to retrieve at least one webpage; and the device is further configured to:
receive an instruction input by a user to identify if at least one native 2-D barcode is contained within the at least one retrieved webpage;
retrieve the at least one webpage according to the instruction and if it is determined that the at least one native 2-D barcode is contained within the at least one retrieved webpage and the native 2-D barcode information cannot be read by the device:
without using an image capturing device on the device to further perform a separate 2-D barcode image acquisition operation, obtain directly by the device, a corresponding decipher key pertaining to the at least one native 2-D barcode from the at least one native 2-D barcode itself, and utilize the corresponding decipher key together with the at least one native 2-D barcode to start a local application within the mobile terminal to retrieve 2-D barcode information associated with the at least one native 2-D barcode according to the corresponding decipher key.

7. The device according to claim 6, is configured to:
display selection options for retrieval of the 2-D barcodes according to received default operation behaviors.

8. The device according to claim 6, is configured to utilize image identification technology to determine whether the at least one retrieved webpage contains image features conformable to 2-D barcode image features.

9. The device according to claim 6, is configured to:
retrieve source codes of the retrieved webpage;
check whether the retrieved source codes contain a 2-D barcode tag, in order to determine whether the retrieved webpage contains the at least one native 2-D barcode.

10. A non-transitory computer-readable storage medium, wherein the computer readable storage medium stores a program which comprises codes or instructions to be executed by a processor circuitry which configures a mobile terminal to identify 2-dimensional (2-D) barcodes contained within a retrieved webpage, wherein the mobile terminal performs operations, comprising:
launching a browser to retrieve at least one webpage;
receiving an instruction input by a user to identify if at least one native 2-D barcode is contained within the at least one retrieved webpage;
if it is determined by the mobile device that the at least one native 2-D barcode is contained within the at least one retrieved webpage and the native 2-D barcode information cannot be read by the mobile device:
without using an image capturing device on the mobile terminal to further perform a separate 2-D barcode image acquisition operation, obtaining directly by the mobile terminal, a corresponding decipher key pertaining to the at least one native 2-D barcode from the at least one native 2-D barcode itself; and
utilizing by the mobile terminal, the corresponding decipher key together with the at least one native 2-D barcode to start a local application within the mobile terminal to retrieve 2-D barcode information associated with the at least one native 2-D barcode according to the corresponding decipher key.

11. The non-transitory computer readable storage medium according to claim 10, wherein prior to the receiving of the instruction for identifying the at least one 2-D barcode, comprising:
displaying selection options for retrieval of the 2-D barcodes according to received default operation behaviors.

12. The non-transitory computer readable storage medium according to claim 10, wherein the determining of the at least one native 2-D barcode contained within the at least one retrieved webpage, comprising:
utilizing image identification technology to determine whether the at least one retrieved webpage contains image features conformable to 2-D barcode image features.

13. The non-transitory computer readable storage medium according to claim 10, wherein the determining of the at least one native 2-D barcode contained within the at least one retrieved webpage, comprising:
retrieving source codes of the retrieved webpage;
checking whether the retrieved source codes contain a 2-D barcode tag, in order to determine whether the retrieved webpage contains the at least one native 2-D barcode.

14. The non-transitory computer readable storage medium according to claim 10, wherein the identifying of the at least one native 2-D barcode and the receiving of the 2-D barcode information associated with the the at least one native 2-D barcode, comprising:
deciphering by the local application within the mobile terminal, the identified at least one native 2-D barcode.

* * * * *